United States Patent [19]

Müller

[11] 4,232,781
[45] Nov. 11, 1980

[54] METHOD OF AND APPARATUS FOR OPERATING A DOSING ARRANGEMENT FOR GOOD AND POORLY FLOWING LOOSE MATERIAL

[75] Inventor: Karl-Heinz Müller, Aachen, Fed. Rep. of Germany

[73] Assignee: Dr. Hans Boeckels GmbH & Co., Aachen, Fed. Rep. of Germany

[21] Appl. No.: 808,549

[22] Filed: Jun. 21, 1977

[30] Foreign Application Priority Data

Jun. 19, 1976 [DE] Fed. Rep. of Germany ....... 2627669

[51] Int. Cl.³ .................... B65G 43/08; G01G 11/12
[52] U.S. Cl. ...................................... 198/505; 222/55
[58] Field of Search ................... 198/505; 222/55, 63, 222/77

[56] References Cited

U.S. PATENT DOCUMENTS

| | | | |
|---|---|---|---|
| 2,618,406 | 11/1952 | Kast | 198/505 |
| 3,162,325 | 12/1964 | Hall et al. | 222/55 |
| 3,190,381 | 6/1965 | Eberhardt et al. | 198/505 |
| 3,494,507 | 2/1970 | Ricciardi | 198/505 |
| 3,897,868 | 8/1975 | Smith, Jr. | 222/55 |

FOREIGN PATENT DOCUMENTS

567252 9/1975 Switzerland .............................. 198/505
1098176 1/1968 United Kingdom ..................... 198/505

*Primary Examiner*—Jeffrey V. Nase
*Attorney, Agent, or Firm*—Becker & Becker, Inc.

[57] ABSTRACT

A method of and apparatus for operating a dosing arrangement for good and poorly flowing loose material such as pulverized material, granular material, and similar material having different specific weights, flow properties, and other properties. The dosing arrangement is operated volumetrically, has a dosing device, such as a worm, which is provided with a controllable or variable drive, and has a gravimetrically operable measuring device which is combined with a belt conveyor which follows the dosing device in sequence and is provided with a similarly controllable or variable drive. The drive for the dosing device and/or belt conveyor is adjusted prior to the start of a dosing process in such a way that a predetermined ratio exists between the two drives for achieving, independent of a preset conveying thickness, a desired thickness of the load of the conveyor belt in relation to the drive speed of the conveyor belt.

4 Claims, 2 Drawing Figures

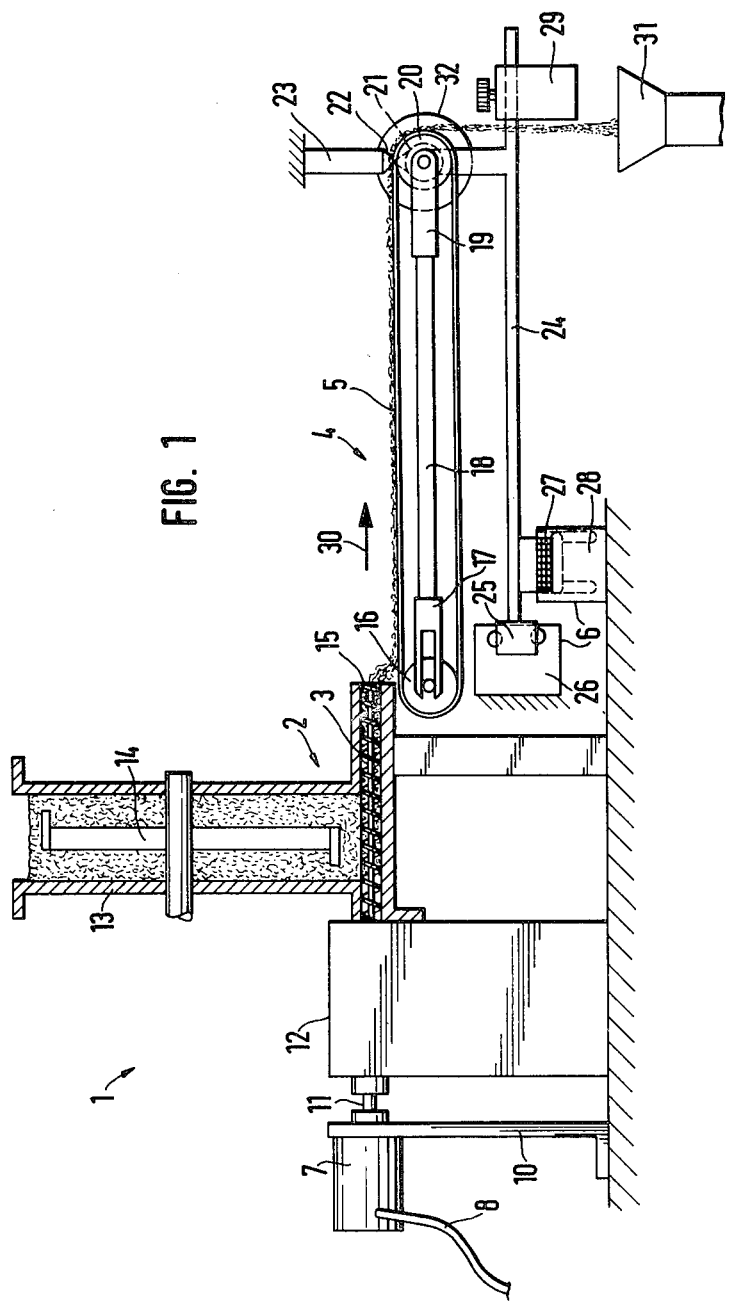

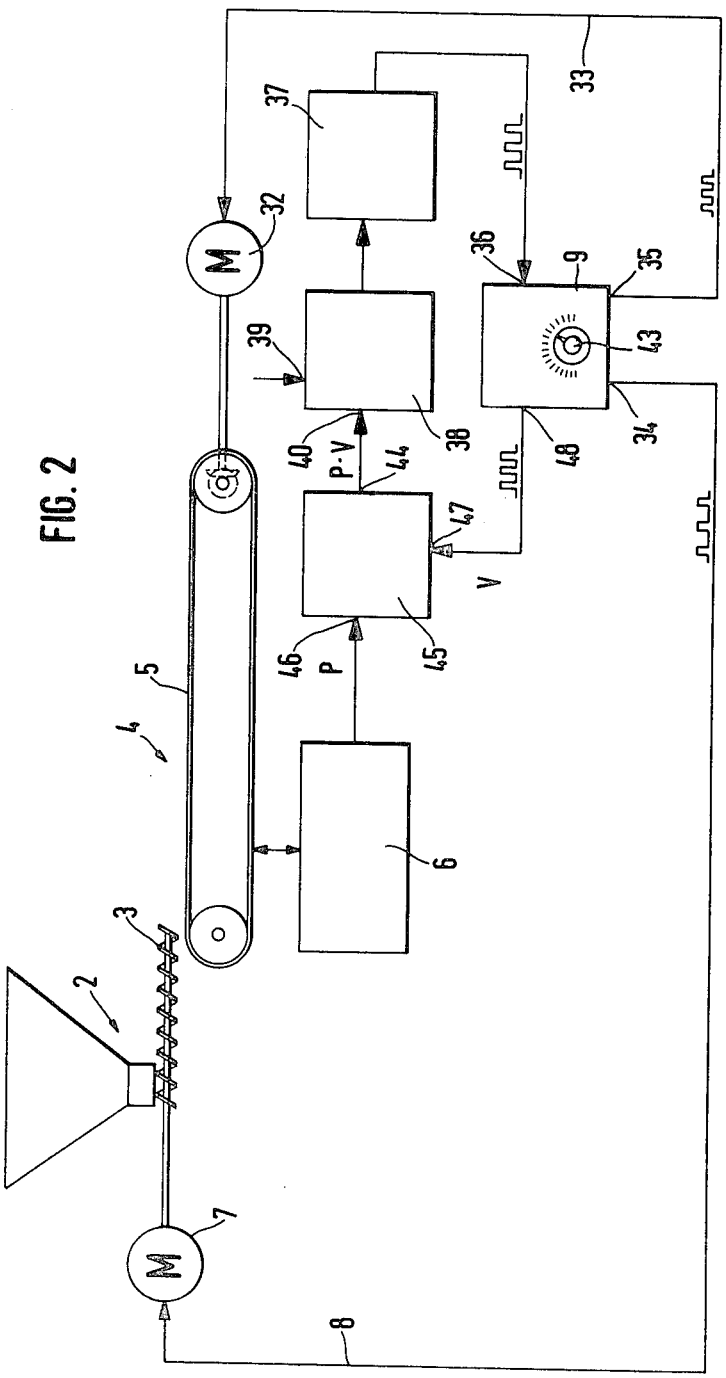

METHOD OF AND APPARATUS FOR OPERATING A DOSING ARRANGEMENT FOR GOOD AND POORLY FLOWING LOOSE MATERIAL

The present invention relates to a method of and apparatus for operating a dosing arrangement for good and poorly flowing loose material such as pulverized material, granular material, and similar material having different specific weights, different flow properties, and other different properties. The dosing arrangement is operated volumetrically, has a dosing device, such as a double-dosing worm, which is provided with a controllable drive, and has a gravimetrically operable measuring device which is combined with a belt conveyor which follows the dosing device in sequence and is provided with a similarly controllable drive.

Dosing arrangements for good and poorly flowing loose material are known in various forms. Such known arrangements include dosing conveyor-type weighers for larger conveying thicknesses. Such weighers are generally constructed in such a way that the conveyor belt withdraws the respective loose material out of a supply bin and that the control for the conveying thickness is effected by controlling the withdrawing or take-up speed of the conveyor belt. This dosing method results in a belt which can be maintained nearly constant. Belt load refers to the volume of the material to be conveyed which is on the conveyor belt in any given unit of length, approximately equivalent to the thickness of the load on the conveyor belt. With these known dosing conveyor-type weighers, which serve for example for the controlled withdrawal of coal out of bins and their supply to mills for coal operated power plants, it is relatively seldom required that very different materials be conveyable over one and the same dosing conveyor-type weigher.

With another known, so-called small dosing conveyor-type weigher, with which dyes, additives for mixtures of different chemicals, and the like are to be dosed, the above mentioned technique of withdrawal from supply containers is useable only in exceptions. In this instance, the following principle is chiefly used: A dosing is driven at constant speed and is provided with a weighing device. Depending upon the ascertained conveying thickness, a controller affects a feed part, which precedes the dosing belt, for example a dosing worm, a conveyor chute, or a similar dosing device with regard to their speed.

Known small dosing conveyor-type weighers are operated in such a way that in the case of a desired change of the conveying thickness, in addition to a correspondingly changed control of the drive motor for the dosing device or the feed part, for example a dosing worm, a correspondingly changed control of the drive motor for the conveyor belt of the conveyor-type weigher is also undertaken. This serves that purpose, with different conveying thicknesses, of preserving an approximately constant belt load.

In operating the known small dosing conveyor-type weighers, however, there is the drawback that these are adjustable only for a relatively narrowly defined field of application. This is so because the belt load changes inversely proportionally to the specific weight of the material to be dosed. As soon as materials with different specific weights are to be successively dosed, one must come to terms with the fact that the volumetric belt load is inversely proportional to the specific weight and that thereby difficulties occur during the dosing process. One of these difficulties consists for example in the danger of loose material dropping from the conveyor belt of the dosing conveyor-type weigher.

The previously described fact that the heretofore known small dosing conveyor-type weighers are operated in such a way that the belt load is inversely proportional to the specific weight of the material to be dosed is all the more undesirable and makes dosing all the more difficult when more complicated properties of the material to be dosed are encountered. Such properties can include progression (Schiessen), flow, adherence or sticking, angle of slope of different gradients, etc. Often allowances for these properties of loose material to be dosed, with known small dosing conveyor-type weighers, with regard to the mode of operation, can only be made by chaning the structure of the dosing conveyor-type weigher by replacing various belt structures with different belt widths.

It is an object of the present invention to operate a dosing arrangement of the above mentioned general type for good and poorly flowing loose materials such as pulverized materials, granular materials, and the like of different specific weights, different flow properties and further different properties in such a way that an optimum conveyance of the loose material to be dosed can be achieved or an optimum loading of the conveyor belt of the conveyor-type weigher can be achieved with regard to the respective properties of the loose material to be dosed with a view to an optimum dosing process, without for this purpose requiring any changeover of the apparatus of the dosing arrangement.

This object and other objects and advantages of the present invention will appear more clearly from the following specification in connection with the accompanying drawings, in which:

FIG. 1 is a schematic illustration of a dosing arrangement pursuant to the present invention; and FIG. 2 is a block diagram of the dosing arrangement of FIG. 1.

The method according to the present invention for operating a dosing arrangement of the above mentioned general type is characterized primarily in that the drive for the dosing device and/or the belt conveyor is adjusted prior to the start of the dosing process in such a way that a predetermined ratio exists between the two drives for achieving, independent of a preset conveying thickness, a desired thickness of the load of the conveyor belt in relation to the drive speed of the conveyor belt.

The method pursuant to the present invention makes possible the control of the dosing of very different loose material with a view to the flow or progression properties, angle of slope, specific weight, and the like, without requiring therefor any apparatus changes or the use of special dosing arrangements directed to an application at any given time. With the present invention, one skilled in dosing methods realizes new possibilities for using one and the same small dosing conveyor-type weighers, since he now has the possibility of choosing the belt load independent of the respectively required conveying thickness.

For simplifying the adjustment of a specific ratio of the drive speeds of the drives for the dosing device (dosing worm) and the belt conveyor, the drive speeds of the drives for the dosing device or the belt conveyor are simultaneously adjusted in the opposite sense.

Actually, a small dosing conveyor-type weigher pursuant to the present invention is already advantageously operable without providing a control for the conveying thickness. However, in case such a control of the conveying thickness is provided, not only the drive for the dosing device but also the drive for the belt conveyor is controlled in conformity with the respective control error. With these measures, a constant weight-determined load of the conveyor belt (grams per unit of belt length) is achieved with a specific opposed relationship of the two drive speeds (drive rotational speeds) as long as no further tampering of the drives for the dosing device and belt conveyor takes place.

For the control of the conveying thickness, it is also possible to merely control the drive for the dosing device in conformity with the control error. This is practical if only relatively small control errors are expected, so that specific changes of the drive speed or drive rotational speed of the dosing device for example a dosing worm, only bring about insignificant changes in the belt load.

In order to simplify the preadjustment of the respectively desired belt load for the operating personnel who is concerned or tasked with the fitting of the small dosing conveyor-type weigher operated pursuant to the invention, it is for example possible, for the adjustment of the ratio of the drive speeds or drive rotational speeds, to place a single combined control knob opposite a scale which is for example divided or broken down according to different specific weights.

The present invention relates further to an apparatus for carrying out the method of the present invention. One such possible apparatus is characterized primarily in that the dosing arrangement is equipped with a drive unit, for example a so-called PIV-drive unit, which is provided with a drive motor and two output or secondary drives, of which one drive is coupled with the dosing device and the other drive is coupled with the belt conveyor. The drives are adjustable with regard to their rotational speed ratio. With such a specific embodiment of the apparatus according to the present invention, it is a matter of speed controllable or variable drives, for the dosing device and belt conveyor, which are known and have been successful for a long time. With such drives, one and/or the other drive is variable as to its rotational speed by means of a friction wheel drive or adjustable V-belt drive transmission.

Pursuant to a preferred further specific embodiment of an apparatus for carrying out the method pursuant to the present invention, which embodiment opens up another field of application, the dosing device and the belt conveyor of the dosing arrangement or small dosing conveyor-type weigher are each equipped with an electric stepping motor which are connected to one or the other of two outlets of an electrical frequency divider or a similarly operating electrical switching arrangement, the inlet of which is connected with a pulse recurrence frequency which is variable by a pulse transmitter which is controlled, if necessary, by a variable gain amplifier. Pulses with adjustable pulse recurrence frequencies are emitted at the outlets of the frequency divider or similarly operated electrical switching arrangement for operating one of the stepping motors. In this connection, it is noted that modern stepping motors are distinguished by extremely small angles of rotation per step, for instance 0.36° per step. It is further noted that these stepping motors can be operated with pulse recurrence frequencies of up to 20 kHz. In connection with this above mentioned variable frequency divider, such stepping motors are accordingly particularly suitable for a dosing arrangement operated pursuant to the present invention since they make possible an adjustment of the drive speed or drive rotational speed within very wide limits not previously attainable. It is also to be noted that with an electrical frequency divider or similarly operating switching arrangement, it is possible to achieve reduction ratios of for example 1:1000 without difficulties and at relatively little expense. A variation of these high reduction ratios is also possible without difficulty, and at little expense. Accordingly, with the aid of the features of the above mentioned means, extremely different ratios of the drive speeds of the drive motors or stepping motors for the dosing device and conveyor belt may be adjusted. These possibilities are aided by the fact that the above mentioned stepping motors, in a rotational speed range of 1:2000, are able to supply a constant turning moment. Finally, such a specific embodiment of the present invention makes it possible to adjust the ratio of the drive speed or drive rotational speed for the dosing device and conveyor belt with only one control knob, for example in conformity with the reading of a scale divided or broken down according to specific weight. The electrical switching arrangement or frequency divider suitable for this purpose is designed and operated in a manner known per se.

With a view toward the greatly broadened application possibilities for small dosing conveyor-type weighers or dosing arrangements operated pursuant to the present invention, and the relatively great, variable, weight-determined loads of the conveyor belt which can be handled by the conveyor-type weigher, a so-called flow scale or balance is combined with the belt conveyor as a measuring device for the weight. It is known to operate the scale or balance linearly over a relatively great measuring range. This means that the method pursuant to the present invention and the device for carrying out this method may be carried out advantageously by means of the use of a flow scale or balance.

With yet another specific embodiment of the dosing arrangement pursuant to the present invention, the belt conveyor, in operation of that end facing away from the dosing device, is pivotally mounted and has, near the opposite end, a control coil which cooperates with a magnet, for example a pot magnet, which is associated with the scale or balance and is stationarily mounted. This design of the conveyor-type weigher, which comprises a belt conveyor and balance or scale, has the advantage that variations in the feeding process can be detected as quickly as possible and with greatest effect by the dosing device, for example a dosing worm.

Further, to assist the measuring efficiency or sensitivity of the conveyor-type weigher, the elements of the apparatus associated with the balance or scale for sensing the position of a weight arm rigidly connected with the belt conveyor are arranged stationarily or on the weighing arm as far as possible from the axis of rotation of the belt conveyor.

It is further advatangeous, for equalizing the weight of the belt conveyor and further elements, in particular elements of the scale or balance, that the weighing arm be provided with a preferably adjustable counterweight.

In order in certain applications, for example with loose material with relatively high specific weight and possible larger vertical distance between the outlet of the dosing device and the upper strand of the conveyor belt of the conveyor-type weigher, to avoid effecting the measuring or weighing results by means of the constant dropping off of the loose material onto the belt conveyor, which dropping off conveys force pulses to the belt conveyor, the belt conveyor is pivotally mounted in the region of the outlet of the dosing device, and, in the region of that end of the belt conveyor which faces away from the dosing device, has a control coil associated with the flow scale or balance. To further increase application possibilities of a dosing arrangement operated pursuant to the present invention, it is advantageous that the dosing device and belt conveyor with flow scale or balance be movably arranged in an approximately horizontal plane relative to one another and to a predetermined extent. As a result of the relative displacement or movement of the dosing device and belt conveyor with flow scale or balance to one another, the control coil of the scale or balance, for example with a uniform conveyor load of the belt conveyor, need only be supplied with a fraction of the strength of the current otherwise necessary for maintaining the zero or normal position of the weighing device or the belt conveyor. By so doing, an increase in the measuring range may be achieved by means of a relative displacement between the dosing device and the conveyor-type weigher.

Referring now to the drawings in detail, FIG. 1 shows a dosing arrangement 1, which essentially comprises a dosing device 2 with a worm 3, a belt conveyor 4 with a conveyor belt 5, and a balance or scale 6.

The worm 3 of the dosing device 2 is operated by a stepping motor 7, which, by means of a electric line 8, is connected with an electrical frequency divider 9 or a similarly operated electrical switching arrangement. The stepping motor 7 is fastened to a stationary flange 10. The drive shaft 11 of the stepping motor 7 passes through a bearing block 12 and is operatively connected with the worm 3 of the dosing device 2, The worm 3 is rotatably mounted on the bottom of a, for example, funnel-shaped supply receptacle 13 in a trough not shown in detail. A stirrer 14 may additionally be provided in the supply receptacle 13. The stirrer 14, in a manner not illustrated, may, for example by means of a further drive unit, also be operatively connected with the stepping motor 7. The outlet 15 of the dosing device 2 is located approximately above a guide pulley or reversing roller 16 for the conveyor belt 5 of the belt conveyor 4. The guide pulley 16 is expediently adjustably mounted within a support 17, with the aid of means which are not shown, for the purpose of tensioning the conveyor belt 5. The support 17 for the guide pulley 16 is firmly connected by means of a connecting element 18 with a support 19 for a further roller 20 which simultaneously serves as a guide and drive pulley. The guide and drive pulley 20 is rotatably journaled in a bearing 21 which is located laterally adjacent to the belt conveyor 4 in the vicinity of the guide and drive roller 20. The bearing 21 in turn is stationarily mounted by means of a so-called cross belt link 22 at the location 23.

The conveyor belt 5, by means of the support 19 for the guide and drive pulley 20, is rigidly connected with a weighing arm 24, on one end of which is located not only the element 25 of a sensing device 26 for the position of the weighing arm 24, but also a control coil 27 which cooperated (Koorespondiert) with a stationary magnet 28, for example, a pot magnet. On a not more precisely illustrated extension, the weighing arm 24 has a preferably adjustable counterweight 29. The counterweight 29 serves to balance or equalize the weight of the belt conveyor 4 and the weight of the weighing arm 24 and further elements connected therewith, such as the element 25 of the scale or balance 6. The scale arm 24 is rigidly connected to said belt conveyor means 4 and also includes elements 25 pertaining to said current scale 6 for sensing the position of said scale arm 24, the elements being spaced as far as possible from the pivot axis of said belt conveyor means 4. The elements 25 are arranged on the scale arm 24. The scale arm 24 comprises a counter weight 29 for compensating for the weight of the belt conveying means and other elements of said current scale. The dosing means 2 has a discharge opening and the belt conveyor means 4 is pivotally mounted within the region of the discharge opening of said dosing means 2 and comprises the control coil 27 within the regions of that end of the belt conveying means 4 which faces away from said belt conveyor means 4. The dosing means 2 and belt conveyor means 4 together with the current balance means 6 are respectively displaceable in substantially horizontal planes relative to each other and to a predetermined extent.

The loose material received by the conveyor belt 5 from the dosing device 2 is transported in the direction of the arrow 30 and iw weighed by the scale or balance 6. Subsequently thereto, the loose material is transferred to a hopper 31 for further treatment.

A stepping motor 32 is provided to operate the guide and drive pulley 20 of the belt conveyor 4. The stepping motor 32, by means of an electric line 33 (FIG. 2), is also connected with the electrical frequency divider 9 or a similarly operated switching arrangement. While the line 8 for the stepping motor 7 is connected with the outlet 34 of the frequency divider 9, the line 33 is connected with the outlet 35 thereof. At the outlets 34 and 35 of the frequency divider 9, are adjustable individually or also together with the aid of a combined control knob 43 in such a way that a predetermined ratio exists between the pulse recurrence frequencies. While the above mentioned pulses are emitted, pulses from a pulse transmitter 37 are conveyed to the inlet 36 of the frequency divider 9; the pulse recurrence frequency of these pulses is controlled by the outlet quantities respectively supplied by a variable-gain amplifier 38. The respective rated value of the conveying capacity of the dosing arrangement is supplied to the inlet 39 of the variable-gain amplifier 38, while the respective actual value of the conveying capacity of the dosing arrangement is supplied to the inlet 40 of the variable-gain amplifier 38. The variable-gain amplifier 38 receives the actual value of the conveying capacity from the outlet 44 of a multiplier 45 having inlets 46 and 47. A weight proportional value (P) is conveyed to the inlet 46 by the scale or balance 6, and a speed proportional value (V) is conveyed to the inlet 47 by the frequency divider 9 or the like, for example, an electronic transmitter. Pulses are conveyed to the inlet 47 of the multiplier 45 from the outlet 48 of the frequency divider 9 or the like; the pulse recurrence frequency of these pulses is proportional to the speed of the conveyor belt 5.

The mode of operation of the arrangement shown in FIGS. 1 and 2 is as follows:

If, for example, loose material having a relatively high specific weight and known flow properties, such as iron powder, is to be dosed or measured out, the frequency divider is adjusted prior to the start of the dosing process in such a way that a material conveyance which is optimum for the dosing process results on the conveyor belt 5. That may, for example, be the case if the pulse recurrence frequency, based on which the stepping motor 32 is operated and which is emitted at the outlet 35 of the frequency divider 9, is twice as great as the pulse recurrence frequency, based on which the stepping motor 7 for the dosing device, for example the worm 3, is operated and which is emitted at the outlet 34. For dosing, for example, granular material of foamed polystyrene (Styropor), the material, for achieving a material conveyance which is optimum for the dosing process, may be introduced onto the conveyor belt 5 with a pulse recurrence frequency, emitted at the outlet 35 of the frequency divider 9, which is four times as great as the pulse recurrence frequency emitted at the outlet 34. Independent of the above, in the case of the illustration pursuant to FIG. 2, if a control error or deviation occurs, to balance or equalize this control error, not only is the pulse recurrence frequency emitted at the outlet 34 correspondingly altered, but the pulse recurrence frequency emitted at the outlet 35 is also correspondingly altered. This can be advantageous in certain applications. However, beyond this proportional adjustment or alteration of the two pulse recurrence frequencies, it is also possible for the operation of the stepping motors 7 and 32, that, after a once firmly fixed ratio of the pulse recurrence frequencies to one another, to balance or equalize a control error which occurs merely by altering the pulse recurrence frequency emitted at outlet 34. The foregoing permits controlling both of the motors or drives in response to respective control errors for regulating the thickness of the load and also permits only controlling the drive for the dosing device in response to respective control errors for regulating the thickness of the load. The first and second drive means or motors 7 and 32 include a transmission having a first output shaft drivingly connected to the dosing means 3 and also include a second output shaft drivingly connected to said belt conveyor means 4. The belt conveyor means 4 is pivotally mounted within the region of that end thereof which is remote from the dosing means 2 and that end of the belt conveyor 4 which is near the dosing means 2 comprises the control coil for motor 7.

It is, of course, to be understood that the present invention is by no means limited to the specific showing in the drawings, but also encompasses any modifications within the scope of the appended claims.

What I claim is:

1. In a method of operating a dosing arrangement, for good and poorly flowing loose material, having a dosing device with a controllable drive, a belt conveyor also with a controllable drive, and a gravimetrically operable measuring device provided with said belt conveyor, the improvement therewith which includes the step of:

adjusting at least one of said drives prior to the start of a dosing process so that the ensuing drive speed ratio between said drives results in predetermined thickness of load kept approximately constant on said belt conveyor so that a predetermined ratio exists between the two controllable drives for achieving a desired thickness of the load of the belt conveyor in relation to the drive speed of the belt conveyor and independently of preset conveying thickness simultaneously adjusting both of said drives in an opposite manner.

2. In a method according to claim 1, which includes the step of controlling both of said drives in response to respective control errors for regulating the thickness of the load.

3. A dosing arrangement for loose material which includes: dosing means, belt conveyor means provided with said dosing means for receiving material from said dosing means, gravimetrically operable measuring means provided with said belt conveyor means, first controllable drive means operatively connected to said dosing means for operating same, and second controllable drive means drivingly connected to said belt conveyor means for driving the latter, at least one of said drive means being speed variable, said drive means including two electric stepping motors respectively associated with said dosing means and said belt conveyor means, frequency divider means having two exits respectively connected to said stepping motors and also having inlet means, pulse emitter means of variable pulse sequence fequency connected to said inlet means, and adjustable amplifier means for controlling said pulse emitter means, said pulse emitter means having exits for releasing pulse sequence frequencies for operating said stepping motors.

4. A dosing arrangement according to claim 3, which includes a single control member setting a predetermined pulse frequency ratio of the pulses at the exits of said frequency divider means.

* * * * *